(12) United States Patent
Coulon et al.

(10) Patent No.: US 7,296,415 B2
(45) Date of Patent: Nov. 20, 2007

(54) LABYRINTH SEAL DEVICE FOR GAS TURBINE ENGINE

(75) Inventors: Sylvie Coulon, Bois le Rois (FR);
Delphine Roussin, Antony (FR);
Martine Bes, Morsang sur Orge (FR)

(73) Assignee: Snecma Moteurs, Paris (FR)

( * ) Notice: Subject to any disclaimer, the term of this patent is extended or adjusted under 35 U.S.C. 154(b) by 441 days.

(21) Appl. No.: 10/969,005

(22) Filed: Oct. 21, 2004

(65) Prior Publication Data

US 2005/0169749 A1 Aug. 4, 2005

(30) Foreign Application Priority Data

Oct. 21, 2003 (FR) .................................. 03 12310

(51) Int. Cl.
*F02C 7/20* (2006.01)
(52) U.S. Cl. ....................................... 60/799; 415/170.1
(58) Field of Classification Search ................... 60/751, 60/726, 806, 796; 415/170.1, 173.5, 174.5
See application file for complete search history.

(56) References Cited

U.S. PATENT DOCUMENTS

| | | | | |
|---|---|---|---|---|
| 4,320,903 A | * | 3/1982 | Ayache et al. ............... | 277/418 |
| 4,397,471 A | * | 8/1983 | Feldman et al. ............. | 277/412 |
| 4,425,079 A | | 1/1984 | Speak et al. | |
| 4,554,789 A | * | 11/1985 | Napoli et al. ................. | 60/751 |
| 4,920,741 A | * | 5/1990 | Liebl .............................. | 60/785 |
| 5,090,865 A | * | 2/1992 | Ramachandran et al. ... | 415/112 |
| 5,096,376 A | * | 3/1992 | Mason et al. ............. | 415/173.5 |
| 5,143,512 A | * | 9/1992 | Corsmeier et al. ........... | 415/115 |
| 5,236,302 A | * | 8/1993 | Weisgerber et al. ....... | 415/173.7 |
| 5,332,358 A | * | 7/1994 | Hemmelgarn et al. ... | 415/174.5 |
| 5,333,993 A | * | 8/1994 | Stueber et al. ............ | 415/175.5 |
| 6,787,947 B2 | * | 9/2004 | Coulon et al. ................. | 310/52 |
| 7,036,320 B2 | * | 5/2006 | Coulon et al. ................. | 60/785 |
| 2003/0223893 A1 | * | 12/2003 | Coulon et al. ............ | 417/423.1 |
| 2005/0172642 A1 | * | 8/2005 | Coulon et al. ................. | 60/806 |
| 2005/0201859 A1 | * | 9/2005 | Coulon et al. ............ | 415/170.1 |

FOREIGN PATENT DOCUMENTS

EP 0 616 113 A1 9/1994

* cited by examiner

*Primary Examiner*—William H. Rodriguez
(74) *Attorney, Agent, or Firm*—Oblon, Spivak, McClelland, Maier & Neustadt, P.C.

(57) ABSTRACT

This invention refers to a labyrinth seal for a gas turbine engine incorporating from upstream to downstream ends, a high pressure compressor with a rotor, a diffuser and a fixed wall element forming at least one part of the internal envelope of the combustion chamber said seal comprising a stator part mounted on the wall element by virtue of an attaching part with flanges and supporting an annular wearing part said wearing part working jointly with a rotor element provided with at least one circumferential tooth integral with rotor of the compressor to form the labyrinth seal. It is characterized by the fact that at least one of the flanges of said attaching means is heavy enough to harmonize the rate of dilatation of the stator part with respect to the dilatation rate of the rotor element during engine accelerations. In conformity with another characteristic, ventilation orifices are arranged in the wall element. The means of intervention offers a means of controlling the clearance of the labyrinth seal clearance.

10 Claims, 1 Drawing Sheet

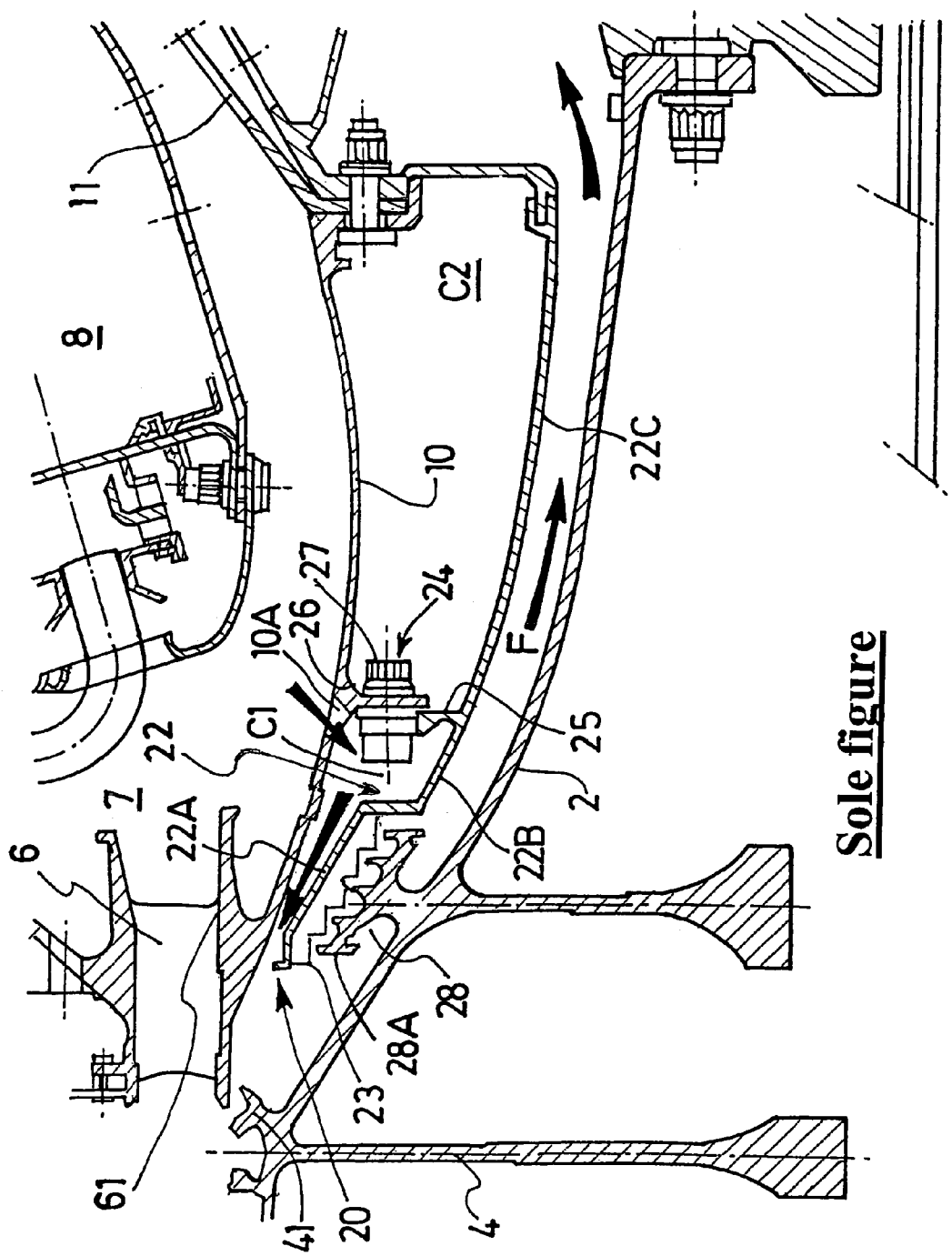
Sole figure

LABYRINTH SEAL DEVICE FOR GAS TURBINE ENGINE

This invention refers to the area of gas turbine engines, focusing on a sealing device including a labyrinth seal for the rotary part of the engine situated at the combustion chamber level.

More particularly, the invention applies to engines having a labyrinth seal providing sealing between the high pressure compression outlet gas flow and the void under the combustion chamber contained by the diffusion housing immediately downstream of the high-pressure compressor and the engine shaft.

A labyrinth seal consists of a cylindrical part integral with the rotor and coaxial with the axis of rotation of the engine. A number of components are installed on this part, shaped as circumferential blades or teeth placed perpendicular to the engine shaft with a narrow free edge, arranged parallel to each other. The teeth work together with a cylindrical part integral with the stator. Each tooth is held a short distance from the stator cylindrical part and forms a throttle for any fluid flow caused by a pressure difference of the seal. The clearance between the two parts determines the leak flow through the labyrinth seal. To prevent the rotary teeth from being damaged in case of contact, the stator cylindrical element has a wearing part of a material that is liable to deform, preferentially with respect to the material forming the teeth. For instance, this can be a honeycomb material or material of a type known in the field under the term "abradable".

In the case of the labyrinth seal mentioned above, this means can be put to good advantage to control the air flow from the compressor passing through it and that is directed towards the ventilation resources of the turbine disk immediately downstream of the combustion chamber. This air comes from the void between the bladed disk of the high-pressure compressor rotor and the diffuser. The pressure prevailing in the void immediately downstream of this sampling point is determined by the throttle formed by the labyrinth. It will be seen that the pressure may fluctuate and this can be damaging to the rotor if the clearance is affected by variations caused by uncontrolled expansion of the seal teeth. Therefore, it is necessary to control the radial clearance of the labyrinth.

During some engine operating phases, for instance, acceleration, air from the compressor may be affected by a considerable temperature increase in a very short period of time. The state or section of the seal is exposed to high temperature whereas the rotor elements of the seal deeper down in the engine are less exposed. Therefore, in so far as the two parts of the seals do not expand in the same way, there is a tendency for the clearance to open up considerably. Accordingly, an attempt is made to control the radial clearance of the labyrinth.

U.S. Pat. No. 4,554,789 describes a means of minimizing the differential thermal expansion between the two parts of the seal to maintain a small clearance during all the engine operating phases. Air is drawn in downstream of the compressor diffuser and directed through orifices formed in the combustion chamber internal diffuser housing into an annular cavity enclosing the seal stator elements. The orifices are arranged in such a way as to form cooling air jets obtained by impact on the outer wall of the seal wearing parts. During the transient operating phases, the air, at a higher temperature, heats the wall. Accordingly, the air ensures a conditioning function and controls the expansion of the clearance. The air is then guided from this cavity by calibrated orifices, directly into the space between the stator and the segments of the rotor which it cools.

It will be observed that the ferrule supporting the wearing parts has a downstream flange to which is attached a clamp flange integral with the diffuser housing wall in the combustion chamber.

There is also the case of U.S. Pat. No. 5,333,993 concerning a labyrinth seal arranged between a high-pressure compressor and a high-pressure turbine. A non-ventilated airspace is arranged around the stator device of a seal supporting the honeycomb elements. Rings are placed in this space around said support. They are made of a material having an expansion factor less than that of the sealing ring. In this way, a minimum clearance is maintained between the teeth and the honeycomb material during engine acceleration.

This invention aims at a solution in which the thermal response of the seal is controlled during the transient engine operating phases to increase the life duration of the seal.

The invention is also designed for greater air flow stability through the seal and thereby minimizes the pressure fluctuations sampled at the compressor.

The invention achieves these objectives by means of a labyrinth sealing device for a gas turbine engine including both upstream and downstream a high-pressure compressor, a diffuser and a fixed wall element forming at least one part of the combustion chamber internal flange envelope said seal including a stator part mounted on the wall element by a flanged attaching device and supporting an annular wearing part, said wearing part working together with a rotor element having circumferential teeth and that is integral with the compressor rotor in forming the labyrinth seal, characterized by the fact that at least one of the flanges of the attaching means has a thermal inertia such that the dilatation response time of the stator part is increased with respect to the dilatation of the rotor element during the engine acceleration phases in order to reduce a leakage flow rate of the labyrinth seal.

In this way, by a simple arrangement, the invention resolves the problem of checking the clearance in the labyrinth seal.

In a preferred embodiment, the wall elements have ventilation holes immediately next to the attaching means. By drawing air in immediately downstream of the last compressor stage and arranging the calibrated orifices in a suitable manner, it is easy to control the dilatation of the stator element during the transient operating phases of the engine.

In an advantageous arrangement, the seal stator can include a first part enclosing the wearing part, extending downstream into a second annular part integral with a radial attaching flange on its outer face, said outer attaching flange working together with an inner attaching flange integral with the section of the wall to form the attaching means.

The second part of the annular stator, the means of attachment and the wall element, together define a first cavity. In particular, the first cavity is fed through the ventilation holes.

In conformity with another characteristic, the first part of the annular stator part, with this element, forms the wall of an open passage towards the upstream end whereby the air from the ventilation holes is fed into the first cavity then into this passage before being exhausted upstream of the labyrinth seal. By this means, a continuous sweep of the first part is obtained forming a support for the wearing parts, and contributing to stabilizing this part with respect to the temperature variations resulting from overheating due to possible friction.

In conformity with another characteristic, the second annular part extends downstream of the flange into a third part, the said second and third parts forming a channel guiding the air leakage from the compressor away from the wall of the combustion chamber envelope. More particularly, the third part forms a second cavity with the combustion chamber envelope wall element.

The invention will be better understood and other advantages revealed by reading the following description of a preferred embodiment of the invention, accompanied by illustrations in which The sole FIGURE represents in an end-on view, a partial view of a gas turbine engine, comprising a labyrinth seal device in conformity with the invention.

The motor shown in the sole FIGURE includes, from left to right, that is, from the upstream to downstream end with respect to the gas flow, a rotor 2 with a compressor disk 4, the blades of which have been left out. This is a high-pressure compressor communicating with a diffuser comprising fixed vanes 6. From this stage, the air is fed into enclosure 7 containing combustion chamber 8. Only part of the upstream end of chamber 8 is visible. Enclosure 7 of the chamber has an inner wall element 10 which connects with stage 6 under platforms 61. As can be seen, the latter form a cornice inside enclosure 7. Wall element 10 is integral with a downstream wall 1 which can only be seen partially and which extends as far as the inlet of the high-pressure turbine stage, not shown. The turbine is mounted on the same rotor shaft 2 as driven by it. It is driven itself by gases from the combustion chamber.

A seal 41 is placed near the air vein between disk 4 and vanes 6 of the diffuser. The leakage air F is guided downstream where it is used in particular to cool the parts linked to the turbine. The flow rate of this air is limited by the interposition of a labyrinth seal 20 in the space under the combustion chamber.

Seal 20 has an annular rotary element 28, the other end having on its outer face a multitude of radial teeth 28A, five in this case, circumferential and parallel to one another. There could be a single tooth or more. The seal is also made up of a stator element 22. This element includes a first part 22A supporting a wearing part 23. The wearing part, which could be in one or several sections, encloses teeth 28A at a determined distance representing the clearance of the seal. In operation, because of the pressure differential between the two sides of the seal, the air flows upstream from the high-pressure area to the low pressure area on the downstream side. This leak flow depends on the clearance. The wearing part 23 is made of an "abradable" material with sufficiently low mechanical strength to give way or to erode when the annular teeth accidentally rub against it.

The stator element has a second part 22B and a third part 22C. They are annular and form an extension to one another. A radial circumferential flange 25 is welded or attached in any other arrangement to the outer face of element 22. Flange 25 is bolted onto a radial circumferential flange 26 integral with the inner side of a wall section 10. Together, the flanges and bolts form the means of attachment 24 of stator element 22 to wall element 10. Advantageously, elements 22B and 22C conformed such a way as to establish an annular channel the opening of which is determined with rotor 2. This housing guides the leakage air from the compressor circulating to the downstream end and ensures an outflow that is as perturbed as little as possible. It reduces the heating of the air.

As can be seen from the figure, elements 22B, 10 and 24 together form an initial annular cavity Cl. The height of this cavity Cl between walls 22B and 10 is determined by the height of attaching device 24. Downstream of device 24, the wall elements 22C and 10 define between one another a second cavity C2. This interior casing offers the additional advantage of isolating the air circulating near the rotor.

Calibrated orifices or ventilation holes 10A are drilled into wall 10 immediately upstream of flange 26. They are oriented in such a way as to feed cavity C1. These holes 10A are advantageously inclined to give the fluid an initial pre-rotational movement. They are placed as close as possible to the flange to cool it and thereby control the movement of the labyrinth for controlling the clearance. The air that has circulated through cavity C1 is directed toward the passage formed between wall elements 10 and stator element 22A. In this way, cavity C1 ensures ventilation above the abradable support to cool it. Its tilting is confined by an almost constant clearance on five teeth. The heat from the labyrinth seal is evacuated on contact between the teeth and the abradable device.

The labyrinth seal device of the invention operates as follows:

During the engine acceleration phases, air from the compressor is at a high temperature. By choosing a solid flange 25 or 26, having considerable thermal inertia, the dilatation response time of stator element 22A is increased. Accordingly, the clearance between stator 22A and element 23 tends to open less, resulting in a smaller leakage flow rate and improving efficiency.

The flow rate of the air is controlled by an arrangement and by the calibration of ventilation orifices 10A in such a way that the dilation of the stator accompanies that of the rotor. More particularly, the clearance section of cavity C1 is at least equal to or greater than the section of holes 10A so as not to decrease the permeability of the system. Holes 10A calibrate the cooling flow rate of the labyrinth. The presence of first cavity C1 also offers better temperature homogenization along parts 22B and 24.

In the permanent configuration, the cooling of the stator element is obtained by the sweeping of the annular zone enclosing stator element 22A beneath wall 10.

The invention claimed is:

1. A labyrinth sealing device for gas turbine engine including, from the upstream to the downstream end, a high-pressure compressor with a rotor, a diffuser and a fixed wall element forming at least one part of the inside envelope of a combustion chamber, said labyrinth sealing device comprising:

a stator part mounted on the fixed wall element by an attaching device with flanges and supporting an annular wearing part, said annular wearing part working together with a rotor element, provided with at least one circumferential tooth and integral with the rotor of the high-pressure compressor to form a labyrinth seal, wherein at least one of said flanges of said attaching device has a thermal inertia such that the dilation response time of the stator part is increased with respect to the dilatation of the rotor during engine accelerations in order to reduce a leakage flow rate of said labyrinth seal.

2. A device according to claim 1, wherein said fixed wall element defines orifices for ventilation located immediately upstream of the attaching device.

3. A device according to claim 2, wherein the stator part includes a first part containing the annular wearing part extending on the downstream side into a second annular part integral with a radial attaching flange on the outside, wherein said radial attaching flange works together with an internal attaching flange integral with said fixed wall element, wherein the second annular part, the attaching device and the fixed wall element, define a first cavity.

4. A device according to claim 3, wherein said first cavity is fed through the orifices for ventilation.

5. A device according to claim 4, wherein said second annular part extends downstream into a third part with said second and third parts forming an air guidance channel at a distance from the inside envelope of said combustion chamber.

6. A device according to claim 5, wherein said third part forms a second cavity with said fixed wall element of the inside envelope of the combustion chamber.

7. A device according to claim 6, wherein said first part forms with said fixed wall element an open passage to an upstream end with air coming from the orifices for ventilation being guided into the first cavity then into said open passage before being evacuated upstream of the labyrinth seal.

8. A device according to claim 1, wherein said fixed wall element, said attaching device and said stator part define a cavity upstream of said attaching device, wherein said fixed wall element defines orifices downstream of said labyrinth seal and upstream of said attaching device such that air enters said cavity via said orifices and flows upstream within said cavity along a passage between said fixed wall element and said stator part supporting said annular wearing part so as to cool said annular wearing part.

9. A device according to claim 8, wherein said passage has an upstream outlet positioned such that said air exists said cavity and said passage upstream of said labyrinth seal, and wherein said labyrinth seal as an upstream inlet such that said air, after exiting said cavity and said passage, enters said labyrinth seal and flows downstream between said annular wearing part and said rotor element that form said labyrinth seal.

10. A device according to claim 8, wherein said passage of said cavity is at least equal to or greater than a section of the orifices.

* * * * *